United States Patent

[11] 3,624,255

[72] Inventors Kurt E. Burdeska
　　　　　　Basel;
　　　　　　Hans Bosshard, Basel; Andre Pugin,
　　　　　　Riehen, all of Switzerland
[21] Appl. No. 3,491
[22] Filed Jan. 16, 1970
[45] Patented Nov. 30, 1971
[73] Assignee Ciba-Geigy AG
　　　　　　Basel, Switzerland
[32] Priority Jan. 21, 1966
[33] 　　　　Switzerland
[31] 　　　　849/66
　　　　　　Continuation-in-part of application Ser. No.
　　　　　　812,953, Mar. 20, 1969, now Patent No.
　　　　　　3,541,099, which is a continuation of
　　　　　　application Ser. No. 609,953, Jan. 16,
　　　　　　1967. This application Jan. 16, 1970, Ser.
　　　　　　No. 3,491

[54] NITRO-ACRIDONE THIOETHERS
　　　17 Claims, No Drawings
[52] U.S. Cl. .................................................. 260/279 R,
　　　　　　　　　　　　260/481 R, 260/609 A, 260/609 D
[51] Int. Cl. .......................................................... C07d 37/30
[50] Field of Search ............................................ 260/279 R

[56] References Cited
UNITED STATES PATENTS
3,188,164   6/1965   Dehn et al. ................... 260/279 X
3,478,010  11/1969   Hoffmann et al. ............ 260/279 X Primary Examiner—Donald G. Daus
Attorney—Wenderoth, Lind and Ponack ABSTRACT: Acridone dyestuffs bearing at the acridone nucleus in 1-position an aliphatically substituted mercapto group and in 4-position $NO_2$ of which those free from acidically water-dissociable solubilizing groups are suitable for the dyeing of hydrophobic synthetic organic fiber materials, especially textile materials consisting of high-molecular organic esters, of synthetic polyamide or of polyolefin fibers, for the dyeing or pigmenting of lacquers, oils and waxes and of cellulose derivatives in the mass; while acid addition salts of the above-defined acridone dyestuffs with strong inorganic or organic acids are suitable for dyeing acrylic fibers, and those containing solubilizing groups are useful for dyeing or printing natural or synthetic polyamide fibers from an acid to neutral bath; methods of dyeing organic materials and especially the aforesaid fibers with the novel dyestuffs suitable therefor, and such fibers dyed with the novel dyestuffs.

3,624,255

NITRO-ACRIDONE THIOETHERS

This is a continuation-in-part application of our pending application Ser. No. 812,953, filed Mar. 20, 1969, now U.S. Pat. No. 3,541,099 which is in turn a streamlined continuation application of our pending application Ser. No. 609,953, filed Jan. 16, 1967.

DESCRIPTION OF THE INVENTION

This invention relates to new nitro-acridone dyestuffs, processes for the production thereof, their use for the dyeing of organic material, particularly the use of those of the novel nitro-acridone dyestuffs which are difficulty soluble in water for the dyeing of hydrophobic organic fibers in aqueous finely dispersed suspensions, and, finally, organic materials dyed with the new acridone dyestuffs.

More particularly, the invention provides for novel nitro-acridone dyestuffs which are obtained by condensing an acridone compound of the formula I

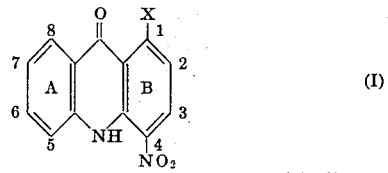

wherein X represents a mobile substituent which makes nucleophilic substitution possible, and wherein the rings A and B can be further substituted and can be condensed with other rings, with a mercapto compound of the formula II

  HS—R  (II)

wherein R represents an unsubstituted or substituted aliphatic or cycloaliphatic radical,
the condensation optionally being performed in the presence of an acid-binding agent, or condensing such acridone compound of formula I with a metal salt of a mercapto compound of formula II, and which novel dyestuffs are of the formula III

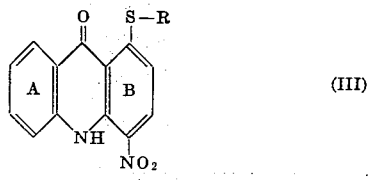

wherein A, B and R have the meanings given in formulas I and II.

The compounds according to the invention containing no substituents which dissociate acid in water and which form water soluble anions such as sulfonic acid, carboxylic acid or phosphoric acid groups, are especially valuable as dispersion dyestuffs.

In formula I, X preferably represents halogen such as fluorine, chlorine or bromine. It can also represent, however, the nitro group or a lower alkoxy group such as the methoxy or ethoxy group.

Aliphatic radicals symbolized by R are, e.g. straight or branched chain alkyl or alkenyl groups having up to 18, preferably alkyl of up to 12 carbon atoms, which groups can be substituted. As substituents, these aliphatic radicals can contain, e.g. the hydroxyl group, lower alkoxy groups, mononuclear aryloxy groups such as the phenoxy, lower alkylphenoxy or halogeno-phenoxy groups, phenyl-lower alkoxy groups such as the phenylmethoxy or phenylethoxy group, phenoxy-lower alkoxy groups such as the phenoxyethoxy group, acyl groups such as, preferably lower alkanoyl, carbalkoxy, alkoxycarbalkoxy or carbocycloalkoxy groups, acyloxy groups such as alkoxy-carbonyloxy groups or tosyloxy groups, amino groups, particularly tertiary amino groups such as di-lower alkylamino groups, acylamino groups such as lower alkanoylamino or mononuclear aroylamino, especially benzoylamino groups, cycloalkyl groups, preferably the cyclohexyl group, carbocyclic-aromatic radicals, e.g. unsubstituted or substituted phenyl, or 1- or 2-naphthyl radicals, or heterocyclic groups, e.g. the 2-thienyl, 2-furyl or 2-tetrahydrofuryl radical.

Cycloaliphatic groups symbolized by R are, e.g. cycloalkyl groups, preferably five- or six-membered rings and, especially, the cyclohexyl group.

All carbocyclic-aromatic rings of the nitro-acridone dyestuffs of formula III can contain the substituents usual in dyestuffs, e.g. halogens such as fluorine, chlorine or bromine; alkyl groups, preferably alkyl groups having up to four carbon atoms, also however, alkyl groups having up to 20 carbon atoms; mononuclear aryl groups such as the phenyl or p-methylphenyl group; alkoxy groups such as the methoxy or ethoxy group; alkylthio groups such as the methylthio or ethylthio group; mononuclear aryloxy or arylthio groups such as the phenoxy or phenylthio group; acyl groups, e.g. hydrocarbon sulfonyl groups such as low alkylsulfonyl or phenylsulfonyl groups, also low carbalkoxy groups; carboxylic or sulfonic acid groups; carboxylic or sulfonic acid amide groups derived from ammonia or primary or secondary organic amines such as carboxylic or sulfonic acid-N-mono- or -N,N-di- low alkylamide groups; primary, secondary and tertiary amino groups, the preferred substituents in secondary and tertiary amino groups being low alkyl groups; acylamino groups, especially low alkanoylamino, e.g. acetylamino groups, or mononuclear aroylamino groups, e.g. benzoylamino or benzene di(carbonylamino) groups, and, further, the nitro, cyano or trifluoromethyl group.

Advantageously, the ring A is not substituted or it contains a lower alkyl group such as the methyl or ethyl group, or an alkoxy group such as the methoxy or ethoxy group, or halogen such as chlorine or bromine. The ring B can contain, above all, a halogen such as chlorine or bromine, especially in the 2-position, as substituent. Preferably, the ring B is not further substituted.

When the rings A and B are further condensed then they contain preferably benzo radicals. For example, the ring A can contain a benzo radical in 7,8-position.

When primary amino groups are present in the end product of formula III, these can still be acylated. Reactive functional derivatives, e.g. of fatty acids such as acetic acid, or of mononuclear aromatic mono- or di-carboxylic acids such as benzoic acid or of a benzene dicarboxylic acid can be used as acylating agents.

In this specification and the appended claims, the term "lower" applied to "alkyl" and "alkoxy" means such groups having one to five carbon atoms, and applied to "alkanoyl" and "alkoxycarbonyl" it means such groups having two to five carbon atoms, unless expressly stated otherwise.

The new nitro dyestuffs of the acridone series which do not contain any water solubilizing groups which dissociate acid in water are suitable for the dyeing of hydrophobic synthetic organic fiber material, e.g. for the dyeing of textile material consisting of high molecular organic esters such as cellulose di- or tri-acetate. They are particularly suitable however, for the dyeing of textile material made from polymeric esters of aromatic polycarboxylic acids with polyvalent alcohols, especially from polyethylene glycol terephthalate or polycyclohexane diol terephthalate. These dyestuffs however, can also be used for the dyeing of synthetic polyamide fibers such as polyhexamethylene adipinamide, polycaprolactam or polyamino undecanoic acid, or for the dyeing of polyolefines, especially of polypropylene fibers. In addition, depending on their composition, they are suitable for the dyeing or pigmenting of lacquers, oils and waxes as well as of cellulose derivatives, particularly cellulose esters such as cellulose acetate in the mass, as many of the nitro-acridone dyestuffs according to the invention are soluble in some of the usual organic solvents, e.g. in acetone or methyl ethyl ketone.

The fiber materials mentioned are preferably dyed from an aqueous dispersion of the nitro-acridone dyestuffs according to the invention which are difficulty water soluble. It is thus of advantage to finely distribute end products of formula III which can be used as dispersion dyestuffs by milling with dispersing agents and, possibly, other milling auxiliaries.

Anionic dispersing agents suitable therefor are, e.g. the alkylaryl sulfonates, condensation products of formaldehyde with naphthalene sulfonic acid, lignin sulfonates; suitable nonionogenic dispersing agents are the fatty alcohol or alkyl phenol polyglycol ethers having a higher alkyl radical.

The dyeing of polyester fibers with the difficulty water-soluble dyestuffs according to the invention from an aqueous dispersion is performed by the processes usual for polyester materials. Polyesters of aromatic polycarboxylic acids with polyvalent alcohols are preferably dyed at temperatures of over 100° C. underpressure. The dyeing can also be performed, however, at the boiling point of the dyebath in the presence of carriers, e.g. alkali metal phenyl phenolates, polychlorobenzene compounds or similar auxiliaries, or by the pad dyeing process in the foulard followed by a hot treatment, e.g. thermofixing, at 180°–210° C. Cellulose diacetate fibers are preferably dyed at temperatures of 80°–85° —C. while cellulose triacetate fibers and synthetic polyamide fibers are advantageously dyed at the boiling point of the dyebath. The use of carriers is not necessary for the dyeing of the latter types of fibers. Nitro-acridone dyestuffs according to the invention can also be used for printing the materials mentioned by the usual methods.

The end products of formula III which can be used as dispersion dyestuffs draw very well onto the hydrophobic organic fiber material mentioned above, particularly onto polyethylene glycol terephthalate fibers and, on this fiber material, produce strong yellow to orange dyeings which have very good fastness to light, washing, milling, rubbing, perspiration, sublimation, solvents and decatising. In addition, in organic solvents, e.g. dimethyl formamide, they have a high molar extinction. Another advantage of the new nitro-acridone dyestuffs is that they can be combined well with blue anthraquinone dyestuffs.

Of special interest, because of their good dyeing properties and accessibility are those dyestuffs falling under formula III in which R is selected from the class consisting of:
a. alkyl or alkenyl of at most 18 carbon atoms;
b. lower alkyl substituted by a substituent selected from
  i. hydroxyl, lower alkoxy, phenyl-lower alkoxy, phenoxy-lower alkoxy or phenoxy;
  ii. cyclohexyl, phenyl or naphthyl;
  iii. alkoxycarbonyl of a total of from two to 19 carbon atoms, phenoxycarbonyl, cyclohexyloxycarbonyl, alkoxyalkoxycarbonyl of a total of from three to 10 carbon atoms,
  iv. lower alkanoyloxy, lower alkoxycarbonyloxy or benzoyloxy, or
  v. an amino group of the formula

wherein $R_1$ is hydrogen, lower alkyl, phenyl or cyclohexyl and $R_2$ is hydrogen or lower alkyl,
c. cyclohexyl; and
d. benzyl substituted by at least one of the following substituents:
  methyl, chlorine, bromine or methoxy; and wherein ring A is unsubstituted or monosubstituted by chlorine, bromine, lower alkyl, lower alkoxy, nitro or amino, and ring B is not further substituted or substituted in 2-position by chlorine or bromine, or wherein ring A has a benzene ring fused thereto in the 6,7 or 7,8-position and ring B is concurrently not further substituted.

Good disperse dyes for the dyeing of hydrophobic organic and particularly polyester fibers are especially those which are free from solubilizing groups which dissociate acid in water, and among the latter, as a first subclass, those in which R represents a lower alkyl group substituted by cyclohexyl, phenyl, phenyl-lower alkoxy, phenoxy-lower alkoxy or phenoxy, and wherein ring A is unsubstituted or monosubstituted by chlorine, bromine, lower alkyl or lower alkoxy and ring B is not further substituted or substituted in 2-position by chlorine or bromine.

End products of formula III not containing water solubilizing groups which dissociate acid, in which R is a phenyl-lower alkyl or phenoxy-lower alkyl radical wherein the alkyl moiety has advantageously from three to five carbon atoms and in which ring A is unsubstituted or monosubstituted by lower alkyl such as methyl or isopropyl, lower alkoxy, especially methoxy or ethoxy, or chlorine or bromine and ring B is not further substituted are preferred as dispersion dyestuffs. Such end products are distinguished by great color strength and affinity to polyester fiber material, particularly to fibers from polymeric esters of aromatic polycarboxylic acids with polyvalent alcohols such as polyethylene glycol terephthalate fibers. In addition, the dyeings attained therewith on this type of fiber are very fast, particularly to light, rubbing, sublimation and washing. Moreover, these nitro-acridone dyestuffs possess the valuable property which is of great technical importance in dyeing of mixed fabrics of appreciably reserving cotton and wool.

Those water-insoluble end products of formula III in which R is an alkyl radical are also very valuable as they have good stability to acid and alkali.

Dyeings on polyester fibers with this subclass of dyestuffs of formula III, especially those in which R represents alkyl of up to 18, particularly alkyl of from two to 12 carbon atoms, and optionally those of this latter subclass, wherein ring A is unsubstituted or monosubstituted by chlorine, bromine, lower alkyl, lower alkoxy, and ring B is not further substituted or substituted in 2-position by chlorine or bromine, are distinguished by superior light fastness, fastness to sublimation, and color depth from other acridones not substituted in 1- and 4-position concurrently.

In the form of salts of a strong inorganic or organic acid, dyestuffs of formula III according to the invention which contain groups which make them basic, generally dissolve well in water. They draw from an aqueous, neutral or—advantageously—also weakly acid liquor, optionally in the presence of wetting agents such as addition products of alkylene oxides and higher alcohols, onto polymeric or copolymeric acrylonitrile fibers on heating in an open or closed vessel under pressure. On this material they produce yellow to orange dyeings which are fast, in particular, to washing, decatizing and light.

The new nitro-acridone dyestuffs of formula III which contain groups which dissociate acid in water, e.g. sulfonic acid groups, can be used for the dyeing and printing of natural or synthetic polyamide fibers from an acid to neutral bath.

Starting materials of formula I wherein X represents chlorine, fluorine, or bromine can be produced, e.g. by condensation of an optionally further substituted aminobenzene compound of the formula

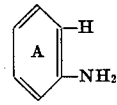

with a 2,6-dichloro-, 2,6-difluoro- or 2,6-dibromo-3-nitrobenzene carboxylic acid of the formula

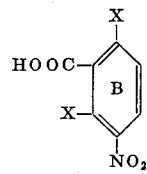

and subsequent ring closure according to K. Lehmstedt and K. Schrader [compare in Berichte der deutschen Chemischen Gesellschaft, Vol. '70, 1,526–38 (1937)], , or they can be produced by condensation of an optionally further substituted aminobenzene carboxylic acid of the formula

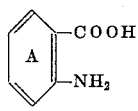

with a 1,3-dichloro-, 1,3-difluoro- or 1,3-dibromo-4-nitrobenzene compound of the formula

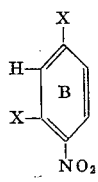

and subsequent ring closure according to H. B. Nisbet [compare in Journal of the Chem. Soc. (London) 1933, 1,372–73].

In the latter case, the optionally further substituted aminobenzene-carboxylic acid can also be condensed with 1-chloro- or 1-bromo-3,4-dinitrobenzene compounds, advantageously in the presence of alcohols, ketones, cyclic ethers, optionally halogenated or nitrated aromatic hydrocarbons or optionally halogenated aliphatic hydrocarbons.

The reaction of the acridone compound of formula I with the mercapto compound of formula II is performed, e.g. in the melt in an excess of mercapto compound or, preferably, in aqueous, organic or organic-aqueous solution or dispersion. Suitable organic solvents are, e.g. aromatic hydrocarbons such as toluene or xylenes, aromatic halogen hydrocarbons such as chlorobenzene, aliphatic ketones such as methyl ethyl ketone or methyl isobutyl ketone, cyclic ethers, e.g. dioxane, amides of low fatty acids, particularly dimethyl formamide, or dialkyl sulfoxides such as dimethyl sulfoxide. The use of an alkali metal salt, particularly the sodium or potassium salt of the mercapto compound of formula II as starting material is recommended or the addition of agents having an alkaline reaction to the reaction mixture is recommended such agents being, in particular, alkali metal carbonates such as sodium or potassium carbonate, or alkali metal hydroxides, preferably sodium or potassium hydroxide. also however, magnesium oxide or tertiary nitrogen bases such as pyridine. In dimethyl sulfoxide, the reaction takes place even at room temperature; in all other solvents, a higher temperature of, e.g. 80°–140° C. is indicated.

A modification of the process according to the invention for the production of nitro-acridone dyestuffs of formula III consists in reacting an acridone compound of formula IV

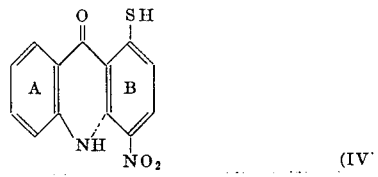

wherein the remarks given for A and B in formula I pertain, with a compound of formula V $$Z-R \quad (V)$$

wherein Z represents a substituent which can be split off as anion, and

R has the meaning given in formula II. Z in formula V preferably represents halogen such as fluorine, chlorine, bromine or iodine; it can also represent, however, a sulfated hydroxyl group or an ester thereof such as an alkyl ester such as the methyl or ethyl ester, or an arylsulfonyloxy group, e.g. the phenylsulfonyloxy or p-methylphenylsulfonyloxy group.

Examples of compounds of formula V are: alkyl alkenyl, aralkyl chlorides, bromides or iodides, dimethyl or diethyl sulfate, benzene sulfonic acid methyl or ethyl ester or p-toluene sulfonic acid methyl or ethyl ester.

Starting materials of formula IV are obtained, e.g. by reacting acridone compounds of formula I wherein X represents chlorine, fluorine or bromine, with alkali metyl sulfides such as sodium sulfide in molar ratio of 1:1, or reacting such acridone compounds with alkali metal hydrogen sulfides such as sodium hydrogen sulfide.

The reaction partners, i.e. a mercapto compound of formula IV and a compound of formula V are reacted, e.g. direct in the presence of acid-binding agents or in aqueous or in aqueous-organic solution or dispersion, the organic moiety of which advantageously consists of water-miscible organic solvents, particularly alcohols such as methanol or ethanol, aliphatic ketones, preferably acetone, cyclic ethers such as dioxane, or amides of fatty acids such as dimethyl formamide, or aliphatic sulfoxides such as dimethyl sulfoxide. Examples of acid-binding agents are alkali metal carbonates or hydroxides or tertiary nitrogen bases such as pyridine. However, such acid-binding agents need not be used if an alkali metal salt, e.g. the sodium or potassium salt of a 1-mercapto-4-nitro-acridone of formula IV is used as starting material.

A second modification of the process according to the invention for the production of nitro-acridone dyestuffs of formula III consists in reacting a compound of formula VI

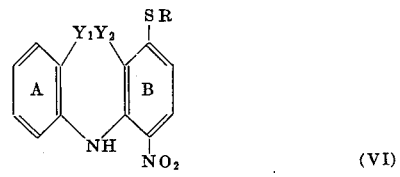

wherein one of $Y_1$ and $Y_2$ represents hydrogen and the other the carboxyl group or a reactive functional derivative thereof, e.g. a halide such as a chloride or bromide, or an ester, e.g. a low alkyl ester, the reaction being performed under cyclizing conditions, optionally in the presence of an acid-condensing agent. Compounds of formula VI wherein $Y_1$ is the carboxyl group and $Y_2$ is hydrogen are preferred for preparative reasons.

Starting materials of formula VI wherein $Y_1$ is the carboxyl group and $Y_2$ is hydrogen are obtained, e.g. by condensation of an optionally further substituted aminobenzene carboxylic acid of the formula

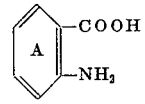

with a benzene compound of the formula

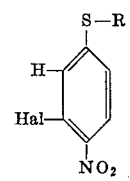

wherein Hal represents chlorine or bromine, the condensation being performed by known methods [cf. H. B. Nisbet, Journal of the Chem. Soc. (London) 1933, 1,372–73].

Starting materials of formula VI wherein $Y_2$ is the carboxyl group and $Y_1$ is hydrogen can be produced, e.g. by condensing an optionally further substituted aromatic amine of the formula

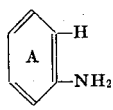

with a 2,6-dichloro- or 2,6-dibromo-3-nitrobenzene carboxylic acid according to K. Lehmstedt and K. Schrader [Berichte der deutschen Chemischen Gesellschaft Vol. 70, 1,526–38 (1937)] then exchanging the chlorine or bromine atom which still remains for the group —S—R.

The ring of compound of formula VI is closed to form the end product of formula III in the known way, advantageously by heating and in the presence of an acid-condensing agent. Preferred acid-condensing agents are phosphoric oxychloride, polyphosphoric acids, possibly also sulfuric acid. Further details regarding this reaction are given in "The Chemistry of Heterocyclic Compounds, Acridines" by R. M. Acheson, p. 105–117 (1956).

The following nonlimitative examples illustrate the invention further. The temperatures are given therein in degrees centigrade. Percentages are by weight unless expressly stated otherwise.

EXAMPLE 1

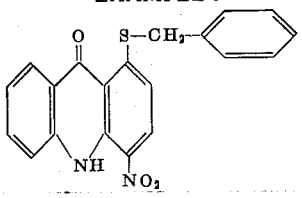

Twelve grams of anhydrous potassium carbonate are added to a dispersion of 41.2 g. of finely pulverized 1-chloro-4-nitro-acridone (m.p. 250°–251°) and 20.4 g. of benzyl mercaptan in 300 ml. of dimethyl sulfoxide, the addition being made at room temperature (20°) while stirring well. The temperature rises to 45°. The yellow slurry which forms after a short time is slowly heated to 90°–95° and stirred for 1 hour at this temperature. The mixture is then cooled to 50° and 1,500 ml. of water are added. The precipitated yellow reaction product is stirred for another 20 minutes and then filtered off. It is washed with hot water and then dried.

After milling with the sodium salt of the condensation product of naphthalene-2-sulfonic acid and formaldehyde, the nitro dyestuff obtained of the above formula dyes polyethylene glycol terephthalate fibers, in the presence of sodium-o-phenyl phenolate as carrier, in greenish yellow shades which have very good fastness to washing, rubbing, light and sublimation.

The nitro-acridone dyestuff of the above formula is also obtained if, with otherwise the same procedure, instead of the 41.2 g. of 1-chloro-4-nitro-acridone, 47.9 g. of 1-bromo-4-nitro-acridone (m.p. 252°–254°) is used. The bromine compound is obtained by condensing 1-nitro-2,4-dibromobenzene with the potassium salt of 2-aminobenzene-1-carboxylic acid and closing the ring in the 2-nitro-5-bromodiphenylamine-2'-carboxylic acid (m.p. 240°–242°) formed. The cyclization is performed in sulfuric acid.

If instead of the 20.4 g. of benzylmercaptan, the equimolar amount of one of the mercapto compounds given in column 2 of the following table I is used and these are reacted as described above with 41.2 g. of 1-chloro-4-nitro-acridone or with 47.9 g. of 1-bromo-4-nitro-acridone, then end products are obtained which dye polyethylene glycol terephthalate fibers in the fast shades given in column 3 of this table.

TABLE I

| No. | Mercapto compound | Shade on polyethylene glycol terephthalate fibres |
|---|---|---|
| 2 | HS—$C_2H_5$ | Greenish yellow. |
| 3 | HS—$C_3H_7$ | Do. |
| 4 | HS—$C_8H_{17}$ | Do. |
| 5 | HS—$C_{12}H_{25}$ | Do. |
| 6 | HS—$CH_2$—$CH_2$—OH | Yellow. |
| 7 | HS—$CH_2$—$CH_2$—$OCH_3$ | Do. |
| 8 | HS—$CH_2$—$CH_2$—$OC_2H_5$ | Do. |
| 9 | HS—$CH_2$—$CH_2$—$CH_2$—$OCH_3$ | Do. |
| 10 | HS—$CH_2$—$CH_2$—$CH_2$—$OC_2H_5$ | Do. |
| 11 | HS—$CH_2$—$CH_2$—O—⟨phenyl⟩ | Do. |
| 12 | HS—$CH_2$—$CH_2$—$COC_2H_5$ | Do. |
| 13 | HS—$CH_2$—$COOCH_3$ | Do. |
| 14 | HS—$CH_2$—$COOC_2H_5$ | Do. |
| 15 | HS—$CH_2$—$COO$-iso-$C_8H_{17}$ | Do. |
| 16 | HS—$CH_2$—$COO$—$CH$($CH_2$)$_3$—$CH_3$ with $C_2H_5$ branch | Do. |
| 17 | HS—$CH_2$—$COO$—⟨phenyl, H⟩ | Greenish yellow. |
| 18 | HS—$CH_2$—$COO$—$CH_2$—$CH_2$—$OCH_3$ | Do. |
| 19 | HS—$CH_2$—$COO$—$CH_2$—$CH_2$—$CH_2$—$OCH_3$ | Do. |
| 20 | HS—$CH_2$—$CH_2$—$NH_2$ | Yellow. |
| 21 | HS—$CH_2$—$CH_2$—NH—$CH_3$ | Do. |
| 22 | HS—$CH_2$—$CH_2$—N($CH_3$)$_2$ | Do. |
| 23 | HS—$CH_2$—$CH_2$—N($C_2H_5$)($CH_2$—phenyl) | Do. |
| 24 | HS—$CH_2$—CH(—CH=CH—O—) (epoxy/furyl) | Greenish yellow. |
| 25 | HS—$CH_2$—CH(—$CH_2$—$CH_2$—O—) (tetrahydrofuryl) | Do. |
| 26 | HS—⟨phenyl, H⟩ | Do. |
| 27 | HS—$CH_2$—⟨phenyl⟩—Cl | Do. |
| 28 | HS—$CH_2$—⟨phenyl, Cl, Cl⟩ | Do. |
| 29 | HS—$CH_2$—⟨phenyl⟩—$CH_3$ | Do. |
| 30 | HS—$CH_2$—⟨phenyl⟩—$OCH_3$ | Do. |
| 31 | HS—$CH_2$—⟨phenyl⟩—Br | Yellow. |
| 32 | HS—$CH_2$—$COO$—($CH_2$)$_{17}$—$CH_3$ | Do. |
| 33 | HS—$CH_2$—CO—O—⟨phenyl⟩ | Do. |
| 34 | HS—($CH_2$)$_5$—$OCH_3$ | Do. |
| 35 | HS—($CH_2$)$_3$—$CH_3$ | Greenish yellow. |
| 36 | HS—($CH_2$)$_4$—$CH_3$ | Do. |
| 37 | HS—$CH_2CH_2$—CH($CH_3$)$_2$ | Do. |
| 38 | HS—($CH_2$)$_6$—$CH_3$ | Do. |
| 39 | HS—($CH_2$)$_7$—$CH_3$ | Do. |
| 40 | HS—$CH_2$—$CH_2$—N($CH_3$)—$COCH_3$ | Yellow. |
| 41 | HS—$CH_2$—$CH_2$—NH—⟨phenyl⟩ | Do. |
| 42 | HS—$CH_2$—$CH_2$—NH—CO—⟨phenyl⟩ | Do. |

3,624,255

Table I—Continued

| No. | Mercapto compound | Shade on polyethylene glycol terephthalate fibres |
|---|---|---|
| 43 | HS—CH$_2$—CH$_2$—NH—C$_6$H$_5$ | Do. |
| 44 | HS—CH(CH$_3$)—CH$_2$—CH$_3$ | Do. |
| 45 | HS—C(CH$_3$)$_3$ | Do. |

EXAMPLE 46

5.8 g. of 1-chloro-4-nitro-7-methyl-acridone are suspended in the solution of 4.44 g. of n-dodecyl mercaptan and 90 ml. of dimethylformamide, and 2 g. of anhydrous potassium carbonate are added at room temperature while stirring. The suspension is then heated for 1½ hours at 110°. After cooling to room temperature, the reaction mixture is diluted with 500 ml. of water, the suspension is stirred for another 20 minutes and then the precipitated orange-yellow reaction product is filtered off. It is washed with water and dried. The yield is 9 g. of nitro-acridone dyestuff of the above formula. 1-chloro-4-nitro-7-methyl-acridone can be produced as follows:

12.1 g. of 5-methyl-2-aminobenzene-1-carboxylic acid are heated to 70°–80° with 325 ml. of amyl alcohol, and at this temperature 12.1 g. of anhydrous potassium carbonate are added during 10 minutes. Then the resulting mixture is heated to the boil and 50 ml. of amyl alcohol are distilled off. After cooling to 60°, 17.8 g. of 1,2-dinitro-4-chlorobenzene are added and the whole is again heated to the boil. Thereby a red solution is obtained from which the red potassium salt of 2-nitro-5-chloro-diphenyl-4'-methyl-2'-carboxylic acid precipitates. The red suspension obtained which can easily be stirred, is heated to the boil overnight. Then it is cooled to room temperature and the precipitated potassium salt is filtered off. The residue is suspended in 300 ml. of water and acidified with 40 ml. of 15 percent hydrochloric acid. After the addition of 6 g. of sulfaminic acid, the amyl alcohol still present is distilled off with steam. The resulting yellow product is filtered off while still hot, washed with water and dried. Yield: 22.3 g. Melting point 240°–241° (from glycial acetic acid). The ring closure to obtain 1-chloro-4-nitro-7-methyl-acridone is effected in the usual way in polyphosphoric acid. Melting point 238°–240°.

By repeating example 46, but using in lieu of dodecyl mercaptan equivalent amounts of the mercaptans used in examples 1 to 4 and 6 to 45, or benzylmercaptan, respectively, the corresponding reddish-yellow 7-methyl acridone dyes falling under formula III are obtained.

If, instead of the 5.8 g. of 1-chloro-4-nitro-7-methyl-acridone, 6.1 g. of 1-chloro-4-nitro-7-ethyl-acridone (m.p. 222°–224°) or 6.33 g. of 1-chloro-4-nitro-7-isopropyl-acridone (m.p. 261°–263°) are used and otherwise the procedure given in the above example is followed, then orange-yellow dyestuffs are also obtained.

All of these dyestuffs, in aqueous dispersion in the presence of sodium-o-phenyl phenolate, dye polyethylene glycol terephthalate fibers in reddish-yellow shades which have very good fastness to light, washing, rubbing and sublimation.

EXAMPLE 47

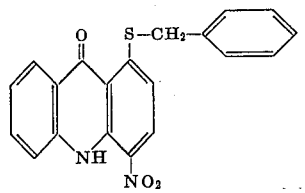

5.5 g. of 1-chloro-4-nitro-acridone are added to a solution of 1.8 g. of sodium sulfide in 120 ml. of ethanol and 30 ml. of water, the addition being made at room temperature while stirring. The reaction mixture is heated to 60°–70° while stirring, this temperature is maintained for 10 minutes and then 5 g. of benzyl chloride are added to this mixture. After refluxing for 4 hours, the mixture is allowed to cool and the precipitated crude 1-benzylthio-4-nitro-acridone of the above formula is filtered off. After purification by recrystallization from chlorobenzene, the reaction product is identical with the dyestuff produced according to example 1.

If in this example 47, with otherwise the same procedure, instead of the 5 g. of benzyl chloride, the equimolar amount of one of the compounds given in column 2 of the following table II is used, then dyestuffs are obtained which dye polyethylene glycol terephthalate fibers in the fast shades given in column 3 of this table.

TABLE II

| No. | Compound | Shade on polyglycol terephthalate fibres |
|---|---|---|
| 48 | Br—CH$_2$—C$_6$H$_5$ | Greenish yellow. |
| 49 | Cl—CH$_2$—C$_6$H$_4$—Cl | Do. |
| 50 | Cl—CH$_2$—C$_6$H$_3$Cl—Cl | Do. |
| 51 | Cl—CH$_2$—C$_6$H$_4$—CH$_3$ | Do. |
| 52 | Br—CH$_2$—CH$_2$—C$_6$H$_5$ | Do. |
| 53 | I—C$_2$H$_5$ | Do. |
| 54 | Br—(CH$_2$)$_4$—CH$_3$ | Do. |
| 55 | Br—CH$_2$—CH=CH$_2$ | Do. |
| 56 | Br—CH$_2$—CH=CH—CH$_3$ | Do. |
| 57 | Cl—CH$_2$—CO—CH$_3$ | Do. |
| 58 | Cl—CH$_2$—CH$_2$—OC$_2$H$_5$ | Do. |
| 59 | Cl—CH$_2$—OC$_2$H$_5$ | Do. |
| 60 | Cl—CH$_2$—CH$_2$—OH | Yellow. |
| 61 | Br—CH$_2$—CH$_2$—O—C$_6$H$_5$ | Do. |
| 62 | 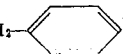 Cl—CH$_2$—CH(CH$_2$—CH$_2$)O (morpholine-type) | Greenish yellow. |
| 63 | Cl—CH$_2$—C(=O)(CH=CH)O | Do. |

TABLE II—Continued

| No. | Compound | Shade on polyglycol terephthalate fibres |
|---|---|---|
| 64 | Br—CH(CH₃)—C₆H₅ | Yellow. |
| 65 | $C_2H_5O-SO_2-OC_2H_5$ | Do. |
| 66 | $Br-(CH_2)_6-O-C_2H_5$ | Do. |
| 67 | $Br-(CH_2)_3-O-C_{18}H_{37}$ | Do. |
| 68 | $Br-CH_2-CH_2-O-CO-OC_2H_5$ | Do. |
| 69 | $Br-CH_2-CH_2-O-SO_2-C_6H_4-CH_3$ | Do. |
| 70 | $Br-CH_2-CH_2-OCOC_2H_5$ | Do. |
| 71 | $Br-CH_2-CH_2-O-CO-CH_3$ | Do. |
| 72 | $Br-CH_2-CH_2-O-CO-C_6H_5$ | Do. |
| 73 | $Cl-CH_2-CH_2-O-C_6H_4-CH_3$ | Do. |
| 74 | $Cl-CH_2-CH_2-O-C_6H_4(Cl)$ | Do. |
| 75 | $Cl-CH_2-CH_2-O-C_6H_4-Br$ | Do. |

EXAMPLE 76

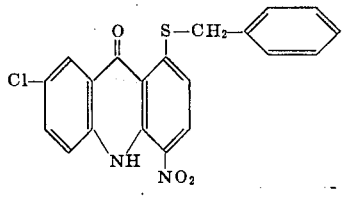

6.18 g. of 1,7-dichloro-4-nitro-acridone (produced by condensation of 1-nitro-2-bromo-4-chlorobenzene with the potassium salt of 5-chloro-2-aminobenzene-1-carboxylic acid and ring closure in phosphorus oxychloride, orange-red crystals when recrystallized from 1,2-dichlorobenzene, m.p. 300°–310°) in 120 ml. of dimethyl sulfoxide are heated for 30 minutes at 90°–95° with 2.7 g. of benzyl mercaptan and 2 g. of anhydrous potassium carbonate. After adding 500 ml. of water, the whole is cooled to room temperature; the precipitated yellow reaction product of the above formula is filtered off, washed with water and then dried.

By repeating example 76, but using in lieu of 2.7 g. of benzyl mercaptan equivalent amounts of the mercaptane employed in examples 1 to 45 respectively, the corresponding 7-chloro-acridone dye falling under formula III are obtained which possess good dyeing properties on polyethylene glycol terephthalate fibers.

EXAMPLE 77

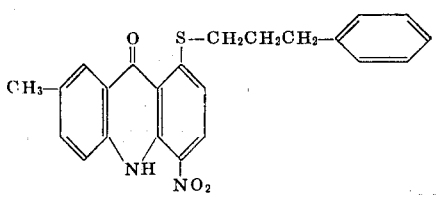

14.43 g. of 1-chloro-4-nitro-7-methyl-acridone and 8.4 g. of γ-phenylpropyl mercaptan are suspended in 180 ml. of dimethyl formamide. While the suspension being cooled with water, 9.61 g. of a 30.9 percent sodium methylate solution are added and the mixture is then heated to 65°–70° and stirred for 1 hour. Afterwards the reaction mixture is still heated for 20 minutes at 90° and then cooled to 10°. The precipitated reddish-yellow nitro dyestuff of the above formula is filtered off. It is washed with methanol, water and then again with methanol and dried. The yield is 17.8 g.

After milling with the sodium salt of a condensation product of naphthalene-2-sulfonic acid with formaldehyde, the dyestuff obtained in this example dyes polyethylene glycol terephthalate fibers in the presence of sodium-o-phenyl phenolate in reddish-yellow shades. The dyeing have a very good fastness to washing, rubbing, light and sublimation. This dyestuff shows particularly good reserve of wool.

By repeating this example but using 13.74 g. of 1-chloro-4-nitro-acridone or 15.94 g. of 1-chloro-4-nitro-7-ethoxy-acridone instead of 14.43 g. of 1-chloro-4-nitro-7-methyl-acridone, 16.2 g. of 1-γ-phenylpropyl-mercapto-4-nitro-acridone or 20.2 g. of the corresponding red-orange 7-ethoxy-acridone dyestuff is obtained.

EXAMPLE 78

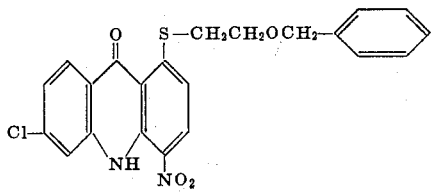

15.45 g. of 1,6-dichloro-4-nitro-acridone and 9.25 g. of 2-benzyloxy-ethyl-mercaptan are suspended in 170 ml. of dimethylformamide. 9.85 g. of a 30.2 percent sodium methylate solution are then added slowly to this suspension at 20°–25. The suspension is heated for 1 hour to 70° and then 10 minutes to 90°. Afterwards the reaction mixture is cooled and the precipitated yellow product is filtered off. This is washed with ethanol and water and dried. Nineteen grams of a yellow dyestuff of the above formula are obtained.

Five gram of this dyestuff are grinded with 15 g. of sodium salt of the condensation product of naphthalene-2-sulfonic acid with formaldehyde. This dye preparation dyes polyethylene glycolterephthalate fibers from an aqueous dispersion in presence of sodium-O-phenylphenolate and gives greenish-yellow dyeings which have good fastness to light and excellent fastness to sublimation.

By repeating this example but using 13.74 g. of 1-chloro-4-nitro-acridone instead of 14.43 g. of 1,6-dichloro-4-nitro-acridone the corresponding nitro-acridone dyestuff is obtained.

EXAMPLE 79

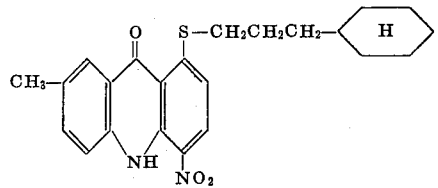

11.55 g. of 1-chloro-7-methyl-4-nitro-acridone and 6.96 g. of 3-cyclohexyl-propyl mercaptan are suspended in 170 ml. of dimethylformamide. 7.86 g. of 30.2 percent sodium methylate solution are added to the suspension while stirring well for 30 minutes. Afterwards the mixture is stirred at 25°–30° for further 20 minutes and then heated to 70°–75° for 1½ hours.

After cooling to 10° the precipitated red yellow product is filtered off, washed with ethanol and water and dried, 15.2 g. of a dyestuff of the above formula are obtained.

This dyestuff draws onto polyethylene glycol terephthalate fibers from aqueous dispersion in presence of sodium o-phenyl phenolate and gives reddish-yellow dyeings which have a good fastness to light and sublimation.

EXAMPLE 80

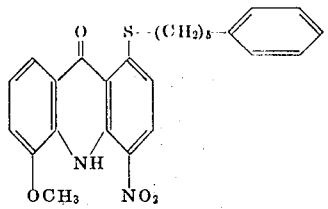

7.95 g. of a 30.2 percent sodium methylate solution are added at room temperature while stirring and cooling to a suspension of 12.2 g. of 1-chloro-4-nitro-5-methoxy-acridone and 7.92 g. of ε-phenyl-amyl mercaptan in 150 ml. of dimethylformamide. Afterwards the mixture is heated to 70° and stirred at this temperature for 2 hours. After cooling to 10° the precipitated dyestuff of the above formula is filtered off. It is then washed with methanol and water and dried. The yield is 16.9 g.

After milling with the sodium salt of a condensation product of naphthalene-2-sulfonic acid with formaldehyde, the dyestuff obtained is this example dyes polyethylene glycol terephthalate fibers, in the presence of sodium-o-phenyl phenolate in reddish-yellow shades. The dyeings have a good fastness to light and sublimation.

By repeating example 80, but using in lieu of ε-phenyl-amyl mercaptan equivalent amounts of δ-phenyl-butyl mercaptan or β-phenyl-ethyl mercaptan the corresponding nitro-acridone dyestuffs falling under formula III are obtained which possess good dyeing properties in polyethylene glycol terephthalate fibers. —

EXAMPLE 81

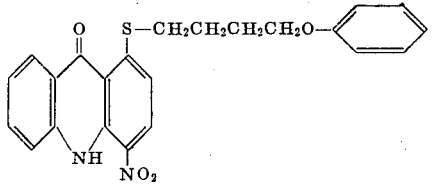

13.74 g. of 1-chloro-4-nitro-acridone and 10 g. of δ-phenoxy-butyl mercaptan are suspended in 170 ml. dimethylformamide. 9.85 g. of a 30.2 percent sodium methylate solution are then added at 20°–25° to the suspension while stirring and cooling with ice water. Afterwards the mixture is heated to 70°–75 for 2 hours. After cooling to 10°–15° the precipitated yellow dyestuff is filtered off, washed with ethanol and water and dried in vacuo at 90°–100°. 19.1 g. of a yellow dyestuff of the above formula are obtained.

By repeating this example but using 9.25 g. of γ-phenoxy-propyl mercaptan instead of 10 g. of δ-phenoxy-butyl mercaptan a further yellow nitro-acridone dyestuff is obtained.

Both dyestuffs obtained in this example dyes polyethylene glycol terephthalate fibers from an aqueous dispersion in the presence of sodium-o-phenyl phenolate, in yellow shades. The dyeings have a very good fastness to light, washing, rubbing and sublimation.

EXAMPLE 82

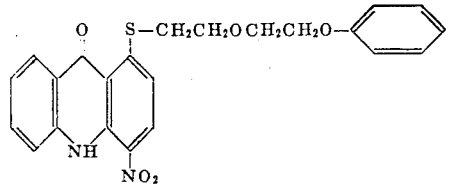

13.73 g. of 1-chloro-4-nitro-acridone and 10.9 g. of 2-mercapto-2'-phenoxy diethylether are suspended in 170 ml. of dimethylformamide. 9.83 g. of a 30.2 percent sodium methylate solution are then added at 20°–25° to the suspension while stirring for 30 minutes. After cooling to 10°–15° the precipitated yellow dyestuff is filtered off, washed with ethanol and water and dried. 19.3 g. of a yellow dyestuff of the above formula are obtained.

This dyestuff dyes polyethylene glycol terephthalate fibers from an aqueous dispersion in presence of sodium-o-phenylphenolate in yellow shades. The dyeings have a good fastness to light, washing, rubbing and especially to sublimation. This dyestuff also shows particularly good reserve of wool.

EXAMPLE 83

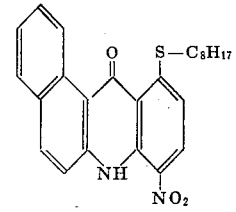

6.48 g. of 1-chloro-4-nitro-7,8-benzacridone (produced by condensation of 2-naphthylamine with 2,6-dichloro-3-nitro-benzene-1-carboxylic acid and ring closure in phosphorus oxychloride (m.p. =330°), 3.21 g. of octylmercaptan, 1.7 g. of anhydrous potassium carbonate and 150 ml. of dimethyl sulfoxide are heated for 1 hour at 90°–95°. After coiling, the yellow suspension is stirred into 500 ml. of water and the mixture is stirred for another 10 minutes. The precipitated yellow dyestuff is filtered off, washed with hot water and then dried.

If the 6.48 g. of 1-chloro-4-nitro-7,8-benzacridone are replaced by 6.48 g. of 1-chloro-4-nitro-6,7-benzoacridone (produced by condensation of 1-nitro-2-bromo-4-chlorobenzene with the potassium salt of 2-naphthylamine-3-carboxylic acid and subsequent cyclization in phosphorus oxychloride, brown-red crystals when recrystallized from o-dichlorobenzene, m.p. 333°–335° (with decomposition), then with otherwise the same procedure, yellow dyestuffs are also obtained.

By repeating example 83, but using in lieu of thiophenol an equivalent amount of the mercaptans used in examples 1 to 3 and 5 to 45, respectively, the corresponding yellow 4-nitro-7,8-benzacridones are obtained.

All of these dyestuffs, after milling with the sodium salt of the condensation products of naphthalene-2-sulfonic acid and formaldehyde, dye polyethylene glycol terephthalate fibers in the presence of sodium-o-phenyl phenolate in yellow shades which have very good fastness to light, washing, rubbing and sublimation.

EXAMPLE 84

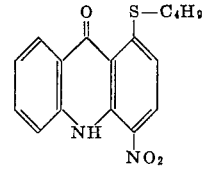

24.9 g. of 2-nitro-5-n-butylmercapto-diphenylamine-2'-carboxylic acid, produced by condensation of 3-chloro-4-nitro-1-n-butylmercaptobenzene with 2-aminobenzene-1-carboxylic acid in the presence of potassium carbonate according to H. H. Hodgson and F. W. Handley, J. Chem. Soc. 1928 (166), and 110 g. of phosphorus oxychloride are brought to the boil within 20 minutes while stirring well and then kept at the boil for another 30 minutes. After cooling to room temperature, the excess phosphorus oxychloride is decomposed with 1,000 g. of ice water. The dispersion formed is heated for 45 minutes at 90°–95° and the precipitated product is filtered off hot, washed with hot water and then dried. The yield is 18.5 g. of nitro dyestuff of the above formula.

After milling with the sodium salt of a condensation product of naphthalene-2-sulfonic acid and formaldehyde, the dyestuff obtained is this example dyes polyethylene glycol terephthalate fibers, in the presence of sodium-o-phenyl phenolate, in greenish-yellow shades.

EXAMPLE 85

24.9 g. of 2-nitro-5-n-butylmercapto-diphenylamine-6-carboxylic acid (produced by condensation of 2-nitro-5-chloro-diphenylamine-6-carboxylic acid with n-butylmercaptan in the presence of potassium carbonate) are added to 210 g. of concentrated sulfuric acid and the whole is heated for 2 hours at 90°–95° while stirring. After cooling, the solution formed is added dropwise to 1,500 g. of ice water. The precipitated yellow product is filtered off and washed free of acid. To purify, it is slurried in 500 ml. of water, 5 g. of sodium carbonate are added and the whole is heated for 45 minutes at 50°. The dyestuff is then filtered off, washed with water and dried. The yield is 17.8 g.

The dyestuff obtained is identical with the product produced according to example 84.

EXAMPLE 86

Two grams of the dyestuff obtained according to example 77 are dispersed in 4,000 g. of water. Twelve grams of sodium salt of p-phenyl phenol are added to this dispersion as carrier and also 12 g. of diammonium sulfate and then 100 g. of polyethylene glycol terephthalate yarn are dyed for 1½ hours at 95°–98°. The dyeing is rinsed with water and then after treated with dilute aqueous sodium hydroxide solution and a dispersing agent, such as a mixture form octylphenyl-polyglycol ether and coconut-oil fatty acid-N,N-bis-($\beta$-hydroxyethyl)-amide. In this way a greenish-yellow dyeing is obtained which is fast to washing, light and sublimation.

If in this example, 100 g. of polyethylene glycol terephthalate yarn are replaced by 100 g. of cellulose triacetate fabric, dyeing is performed under the conditions given and then the dyeing is rinsed with water, then a greenish-yellow dyeing is obtained which has very good fastness to washing and sublimation.

EXAMPLE 87

Two grams of the dyestuff obtained according to example 46 are finely dispersed in 2,000 g. of water containing 4 g. of oleyl polyglycol ether, in an apparatus for dyeing under pressure. The pH of the dyebath is adjusted to 6–6.5 with acetic acid.

One hundred grams of polyethylene glycol terephthalate fabric are introduced at 50°, the bath is heated to 130° within 30 minutes and the fabric is dyed for 50 minutes at this temperature. The dyeing is then rinsed with water, soaped and dried. Under these conditions a reddish-yellow dyeing is obtained which is fast to washing, perspiration, light and sublimation.

The dyestuffs described in the other examples produce dyeings of equal quality in this process.

EXAMPLE 88

Polyethylene glycol terephthalate fabric (such as "Dacron," Registered Trademark of E. J. Dupont de Nemours, Wilmington, Del., USA) is impregnated in a foulard at 40° with a liquor of the following composition:
20 g. of the dyestuff according to example 52, finely dispersed in
7.5 g. of sodium alginate
20 g. of triethanolamine
20 g. of octylphenol polyglycol ether and
900 g. of water.

2100°fabric, centrifuged to a content of about 100 percent (calculated on the dry weight) is dried at 100° and the dyeing is then fixed for 30 seconds at a temperature of 210°. The dyed goods are rinsed with water, soaped and dried. Under these conditions a greenish-yellow dyeing is obtained which is fast to washing, rubbing, light and sublimation.

EXAMPLE 89

0.5 g. of the basic dyestuff obtained according to example 22 are slurried with 0.5 g. of 80 percent acetic acid and dissolved by the addition of 4,000 g. of hot water. One further gram of 80 percent acetic acid, 2 g. of sodium acetate and 4 g. of an addition product of 15 mols of ethylene oxide to olein alcohol are added to this solution and 100 g. of polyacrylonitrile fibers are introduced into the bath. The bath is heated to 90° within 30 minutes, kept at this temperature for 10 minutes and then dyeing is performed at the boil for 1 hour. The dyebath is almost completely exhausted. The dyed goods so treated are then soaped for 15 minutes at 80° in 5,000 g. of water with the addition of 6 g. of sodium salt of oleic acid-N-methyl-N-$\beta$-sulfonic acid ethylamide, then rinsed and dried. The polyacrylonitrile fibers are dyed in pure yellow shades which have excellent fastness to washing and decatizing.

We claim:
1. A dyestuff of the formula

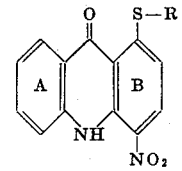

wherein
is selected from the class consisting of:
a. alkyl or alkenyl of at most 18 carbon atoms;
b. lower alkyl substituted by a substituent selected from
 i. hydroxyl, lower alkoxy, phenyl-lower alkoxy, phenoxy-lower alkoxy or phenoxy;
 ii. cyclohexyl, phenyl or naphthyl;
 iii. alkoxycarbonyl of a total of from two to 19 carbon atoms, phenoxycarbonyl, cyclohexyloxycarbonyl, alkoxyalkoxycarbonyl of a total of from three to 10 carbon atoms,
 iv. lower alkanoyloxy, lower alkoxycarbonyloxy or benzoyloxy, or
 v. an amino group of the formula

wherein $R_1$ is hydrogen, lower alkyl, phenyl or cyclohexyl and $R_2$ is hydrogen or lower alkyl,
c. cyclohexyl; and
d. benzyl substituted by at least one of the following substituents methyl, chlorine, bromine or methoxy; and wherein ring A is unsubstituted or monosubstituted by chlorine, bromine, lower alkyl, lower alkoxy, nitro or amino, and ring B is not further substituted or substituted in 2-position by chlorine or bromine, or wherein ring A has a benzene ring fused thereto in the 6,7 or 7,8-position and ring B is concurrently not further substituted.

2. A dyestuff as defined in claim 1 wherein ring A is unsubstituted or monosubstituted by chlorine, bromine, lower alkyl or lower alkoxy and ring B is not further substituted or substituted in 2-position by chlorine or bromine.

3. A dyestuff as defined in claim 2 wherein R is a lower alkyl substituted by cyclohexyl, phenyl, phenyl-lower alkoxy, phenoxy-lower alkoxy or phenoxy.

4. A dyestuff as defined in claim 3 wherein R is a phenyl-lower alkyl or phenoxy-lower alkyl.

5. A dyestuff as defined in claim 4 wherein ring A is unsubstituted or monosubstituted by lower alkyl, lower alkoxy, chlorine or bromine and ring B is not further substituted.

6. A dyestuff as defined in claim 4, wherein R is a phenyl-lower alkyl or phenoxy-lower alkyl wherein the alkyl moiety has from three to five carbon atoms.

7. A dyestuff as defined in claim 1 wherein R represents alkyl of from one to 18 carbon atoms or cyclohexyl.

8. A dyestuff as defined in claim 7 wherein R is octyl and rings A and B are unsubstituted.

9. A dyestuff as defined in claim 8 wherein R is octyl, ring A is substituted in 7-position by chlorine and ring B is not further substituted.

10. A dyestuff as defined in claim 1 wherein R represents lower alkyl substituted by alkoxycarbonyl of a total of from two to 19 carbon atoms, phenoxycarbonyl, cyclohexyloxycarbonyl, alkoxyualkoxycarbonyl of a total of three to 10 carbon atoms, lower alkanoyloxy, lower alkoxycarbonyloxy or benzoyloxy.

11. A dyestuff as defined in claim 1, wherein R represents lower alkyl substituted by a radical of the formula $$-N\begin{matrix}R_1\\R_2\end{matrix}$$

wherein $R_1$ represents hydrogen, lower alkyl, phenyl or cyclohexyl and $R_2$ represents hydrogen or lower alkyl.

12. A dyestuff as defined in claim 1, wherein R represents a hydroxy-lower alkyl or lower alkoxy-lower alkyl and ring A is unsubstituted or monosubstituted by chlorine, bromine, lower alkyl or lower alkoxy and ring B is not further substituted.

13. A dyestuff as defined in claim 3 wherein R is benzyloxyethyl.

14. A dyestuff as defined in claim 5 which is of the formula

15. A dyestuff as defined in claim 5 which is of the formula

16. A dyestuff as defined in claim 13 which is of the formula

17. A dyestuff as defined in claim 5 which is of the formula

* * * * *